3,138,584
CYCLOPENTANOPHENANTHRENE COMPOUNDS AND PROCESS
John A. Zderic, Mexico City, Mexico, assignor, by mesne assignments, to Syntex Corporation, a corporation of Panama
No Drawing. Filed May 2, 1961, Ser. No. 107,049
21 Claims. (Cl. 260—239)

The present invention relates to novel cyclopentanophenanthrene compounds and to a process for the production thereof.

More particularly the present invention relates to 11a-aza-C-homo-androstane hormones and more specifically to 11a-aza-C-homo-androstanes containing a keto, hydroxy or acyloxy group at C-3 and C-17 and which may also contain an aliphatic hydrocarbon group at C-17α, to the N-acylated and N-alkylated as well as the quaternary ammonium salts thereof.

The novel compounds of the present invention which are anabolic agents exhibiting anti-estrogenic, anti-gonadotrophic and hypotensive properties are represented by the following formulas:

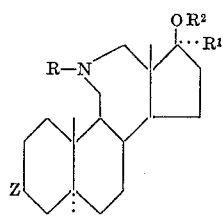
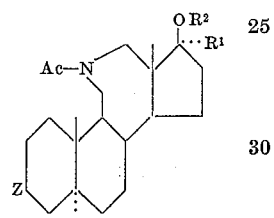

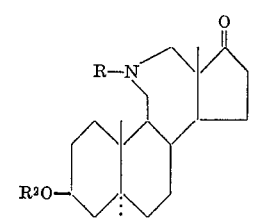
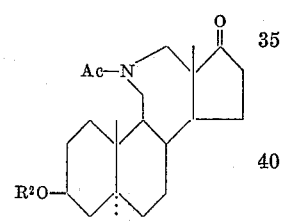

In the above formulas R represents hydrogen, alkyl or aralkyl groups containing up to 12 carbon atoms. $R^1$ represents hydrogen or an aliphatic hydrocarbon group, saturated or unsaturated, containing up to 8 carbon atoms such as methyl, ethyl, propyl, vinyl, propenyl, butenyl, ethinyl, propinyl and butinyl. $R^2$ represents hydrogen or the acyl radical of a hydrocarbon carboxylic acid of less than 12 carbon atoms. Z indicates a keto group, a β-hydroxy group or a β-hydrocarbon carboxylic acyloxy group of less than twelve carbon atoms. The acyl groups are derived from hydrocarbon carboxylic acids of less than 12 carbon atoms, saturated or unsaturated, of straight, branched, cyclic or cyclic-aliphatic chain, aromatic and may be substituted by functional groups such as hydroxy, alkoxy containing up to 5 carbon atoms, acyloxy containing up to 8 carbon atoms, amino, nitro or halogen. Typical ester groups are the acetate, propionate, butyrate, benzoate, cyclopentylpropionate, aminoacetate, β-chloropropionate, hemisuccinate, enanthate, caproate, trimethylacetate, methoxyacetate, phenoxyacetate and phenylpropionate. Ac represents the acyl radical of a hydrocarbon carboxylic acid of less than 12 carbon atoms as described above but is preferably the cetyl or lower alkanoyl radical.

The novel compounds may be prepared by a process illustrated in part by the following equation:

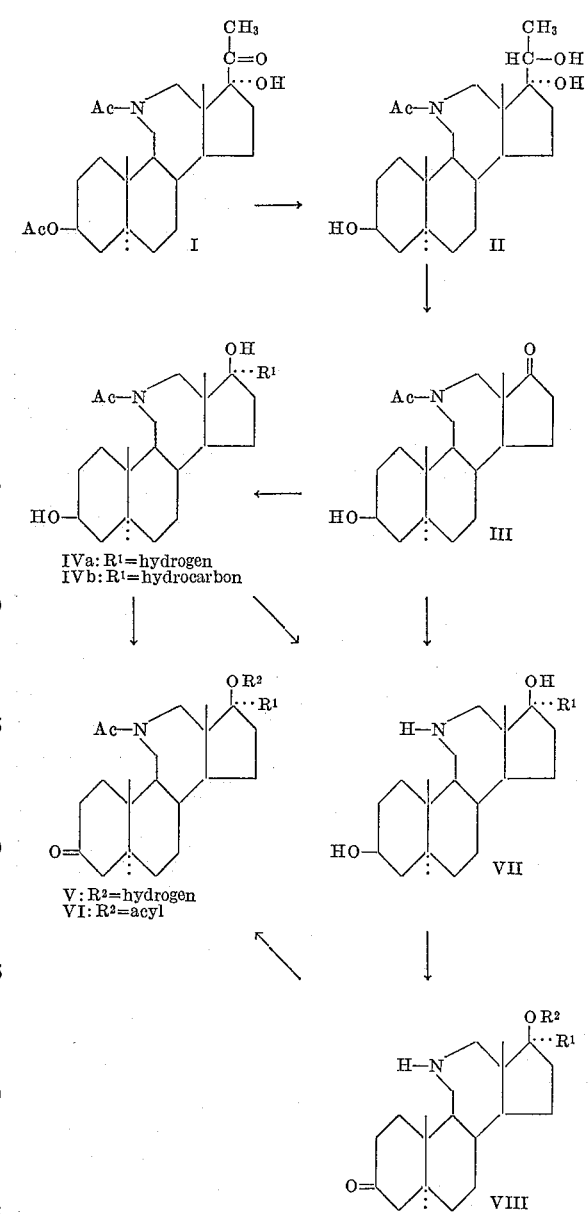

In practicing the process outlined above, the starting compound I is produced by reacting 11β, 12β-dihydroxytigogenin, described by Djerassi et al., J. Org. Chem. 16, 1278 (1951), with lead tetraacetate in an inert solvent such as benzene to form 11,12-seco-5α,22a-spirostan-3β-ol-11,12-dial. The dialdehyde is then reacted with ammonia in ethanol solution thereby yielding a Schiff base type intermediate which is then treated with lithium aluminum hydride in tetrahydrofuran to yield 11a-aza-C- homo-5α,22a-spirostan-3β-ol. Degradation of the spiroketal side chain is then effected by conventional procedure as by reaction with acetic anhydride at about 200° C., oxidation of the resulting pseudo-compound to the diosone and alkaline hydrolysis and acetylation of the latter thus forming 11a-N-acetyl-C-homo-Δ16-allopregnen-3β-ol-20-one acetate. The degradation of the side chain may be preceded by acylation, preferably acetylation, thus forming 3β-acetoxy-11a-N-acetyl-C-homo-5α, 22a-spirostan which may then be subjected to degradation of the side chain to form the 11a-N-acetyl-C-homo-Δ16-allopregnen-3β-ol-20-one acylate.

A hydroxyl group is then introduced at C–17α by first epoxidizing the double bond at C–16,17, preferably by reaction with aqueous alkaline peroxide in which case the acyloxy group at C–3 is saponified and there is formed 11a - N - acetyl - C - homo - 16α,17α-epoxy-allopregnan-3β-ol-20-one. Reacylation with a hydrocarbon carboxylic acid anhydride of less than 12 carbon atoms, preferably acetic anhydride, affords 11a-N-acetyl-C-homo-16α,17α-epoxy-allopregnan-3β,ol-20-one acylate. The latter compound may also be prepared by epoxidizing the 16,17-double bond of 11a-N-acetyl-C-homo-Δ16-allopregnen-3β-ol-20-one acylate with t-butylhydroperoxide [see Yang, J. Am. Chem. Soc. 80, 5845 (1958)] which reaction does not affect the 3β-acyl group. The resulting 3β-acyloxy-11a - N - acetyl - C - homo - 16α,17α - epoxy - allopregnan-20-one is reacted with hydrogen bromide to form the 16β-bromo-17α-hydroxy grouping which upon treatment with Raney nickel results in reductive debromination and there is formed the starting compound 11a-N-acetyl-C-homo-allopregnane-3β,17α-diol-20-one-3-acylate (I). Upon treatment of the latter compound with a double metal hydride such as sodium borohydride there is formed 11a-N - acetyl - C - homo - allopregnane - 3β,17α,20 - triol (II). The triol is then reacted with either sodium periodate in aqueous methanolic tetrahydrofuran or lead tetraacetate in acetic acid to obtain 11a-N-acetyl-C-homo-androstane-3β-ol-17-one (III) which upon treatment with sodium borohydride is transformed into 11a-N-acetyl-C-homo-androstane-3β,17β-diol (IVa). Either of the foregoing compounds can be esterified by conventional methods with hydrocarbon carboxylic acids of less than 12 carbon atoms, to afford the 3β-acylate of 11a-N-acetyl-C-homo-androstan-3β-ol-17-one or the 3β,17β-diacylate of 11a-N-acetyl-C-homo-androstane-3β,17β-diol.

For introduction of the 17β-hydroxy-17α-aliphatic hydrocarbon grouping, 11a-N-acetyl-C-homo-androstan-3β-ol-17-one (III) is reacted with exactly two equivalents of an aliphatic magnesium halide such as methyl magnesium bromide, ethyl magnesium bromide, vinyl magnesium bromide or ethinyl magnesium bromide in a solvent such as tetrahydrofuran to form the 11a-N-acetyl-C-homo-17α-aliphatic hydrocarbon substituted-androstane-3β,17β-diol (IVb). Oxidation of this latter compound with pyridine-chromium trioxide complex at room temperature affords 11a-N-acetyl-C-homo-17α-aliphatic hydrocarbon substituted androstan-17β-ol-3-one (V). Esterification of the tertiary hydroxy group at C–17 may then be effected in benzene solution with hydrocarbon carboxylic acid anhydride of less than 12 carbon atoms in the presence of p-toluenesulfonic acid to form 11a-N-acetyl-C-homo-17α-aliphatic hydrocarbon substituted androstan-17β-ol-3-one-17-acylate (VI).

Upon reaction of 11a-N-acetyl-C-homo-androstan-3β-ol-17-one (III) with an excess of an aliphatic magnesium halide as described above, there is formed 11a-aza-C-homo-17α-aliphatic hydrocarbon substituted androstane-3β,17β-diol (VII), which upon oxidation with chromic acid in pyridine solution is transferred into 11a-aza-C-homo-17α-aliphatic hydrocarbon substituted androstan-17β-ol-3-one (VIII). Conventional esterification of the latter compound with hydrocarbon carboxylic acid anhydrides of less than 12 carbon atoms affords the corresponding 11a-N-acyl-17β-ol derivatives (V) whereas esterification with the hydrocarbon carboxylic acid anhydrides in an inert organic solvent and in the presence of p-toluenesulfonic acid provides the corresponding 11a-N-acyl-17β-acylates (VI).

The novel 11α-N-alkylated-C-homo compounds of the present invention are prepared by a process illustrated by the following equation:

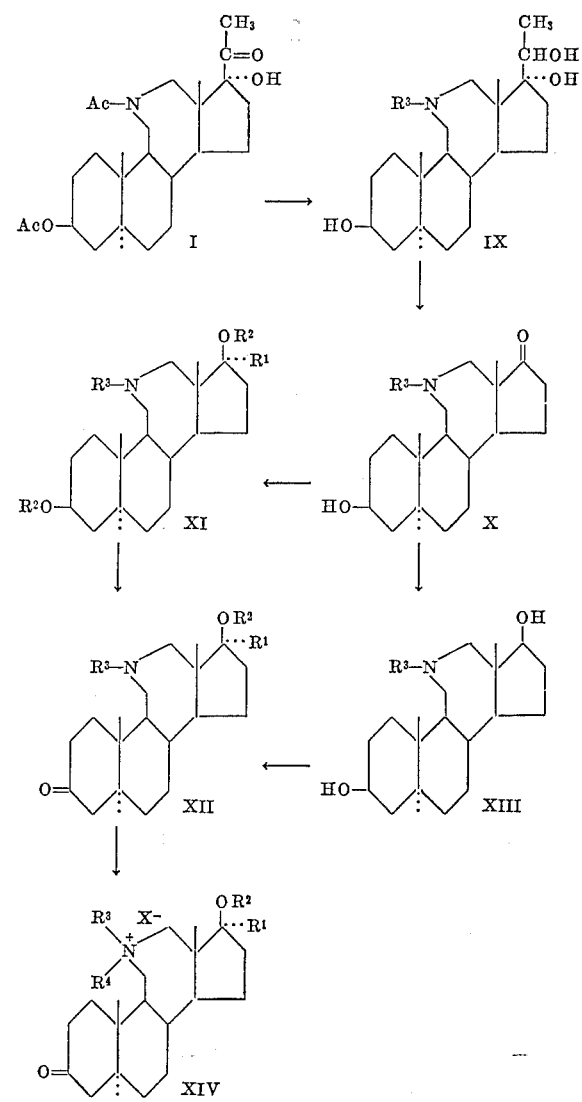

In the above formulas Ac, R¹ and R² have the same meaning as set forth previously. R³ indicates an alkyl or aralkyl group containing up to 12 carbon atoms; R⁴ represents a lower alkyl group and X represents a halogen such as iodine, chlorine or bromine.

In practicing the process outlined above, an 11a-N-acyl-C-homo-allopregnan-3β,17α-diol-20-one-3β-acylate, preferably 11a-N-acetyl-C-homo-allopregnane-3β,17α-diol-20-one-3-acetate (I) is refluxed with lithium aluminum hydride in an inert solvent such as tetrahydrofuran for a period of time of the order of 5 hours to form 11a-N-ethyl-C-homo-allopregnane-3β,17α,20-triol (IX), which upon cleavage with sodium periodate or lead tetraacetate affords 11a-N-ethyl-C-homo-androstan-3β-ol-17-one (X). Treatment of this compound with a lower alkyl, alkenyl or alkinyl magnesium halide such as for example methyl magnesium bromide, vinyl, or ethinyl magnesium bromide, in an inert solvent such as tetrahydrofuran, affords the corresponding 17α-aliphatic hydrocarbon substituted-11a-N-ethyl-C-homo-androstan-3β,17β-diol (XI). Treatment of this latter compound with an oxidizing agent such as pyridine-chromium-trioxide complex provides the corresponding 3-keto compound (XII). Acylation of the thus formed 17α-aliphatic hydrocarbon substituted 11a-N-ethyl-C-homo-androstan-17β-ol-3-one as by reaction with hydrocarbon carboxylic acid anhydride of less than 12 carbon atoms in the presence of p-toluenesulfonic acid furnishes the 17α-aliphatic hydrocarbon substituted-11a-N-ethyl-C-homo-androstan-17β-ol-3-one-17-acylate.

The same method when applied to a 3,17-diol such as the 17α-aliphatic hydrocarbon substituted-11a-N-ethyl-C-homoandrostane-3β,17β-diol furnishes the 3β,17β-diacylate; whereas when p-toluenesulfonic acid is absent, selective acylation at C–3β is effected thus furnishing the 3β-acylate of this last mentioned diol.

Upon treatment of 11a-N-ethyl-C-homo-androstan-3β-ol-17-one (X) with sodium borohydride, there is formed the diol (XIII) which can be conventionally esterified to yield the diester of 11a-N-ethyl-C-homo-androstane-3β,17β-diol.

Quaternary ammonium salt derivatives of all of the N-alkylated compounds are prepared by conventional reaction with an alkyl or aralkyl halide containing up to 12 carbon atoms in a solvent such as a nitroalkane. Thus for example, 11a-N-ethyl-C-homo-androstan-3β-ol-17-one dissolved in nitromethane is reacted with methyl iodide to afford the methoiodide of 11a-N-ethyl-C-homo-androstan-3β-ol-17-one.

There are obtained other N-acylated and N-alkylated compounds by substituting for the N-acetyl group other acyl radicals derived from hydrocarbon carboxylic acids of less than 12 carbon atoms of the type described previously. Thus there are obtained N-acylated and N-alkylated compounds containing up to 12 carbon atoms such as N-propionyl, N-butyryl, N-benzoyl and the corresponding N-propyl, N-butyl and N-benzyl derivatives.

The following examples serve to illustrate but are not intended to limit the scope of the invention:

*Example I*

To a mixture of 8.1 g. of 11β,12β-dihydroxy-tigogenin described by Djerassi et al., J. Org. Chem. 16, 1278 (1951), 140 ml. of glacial acetic acid and 210 ml. of thiophene-free benzene, 12.1 g. of lead tetraacetate were added and the mixture was stirred at room temperature for 5 minutes. 200 ml. of water containing 100 g. of sodium acetate and 4 g. of sodium iodide were added, the color was discharged by the addition of 80 ml. of saturated aqueous sodium thiosulfate solution and the product extracted twice, using each time 200 ml. of ethyl acetate. The pooled extracts were washed with aqueous sodium bicarbonate and water, dried over anhydrous sodium sulfate and evaporated to dryness. The residue was crystallized from a mixture of 60 ml. of methanol and 12.5 ml. of water to afford 11,12-seco-5α,22a-spirostan-3β-ol-11,12-dial.

A mixture of 5 g. of the dialdehyde and 250 ml. of ammonia-saturated ethanol was refluxed during 10 hours. Upon evaporation of the solvent, a crystalline residue was obtained which was refluxed with 2.5 g. of lithium aluminum hydride, in mixture with 250 ml. of tetrahydrofuran during 20 hours. The excess of hydride was then decomposed by careful addition of acetone, then a small amount of saturated aqueous sodium sulfate solution and finally solid anhydrous sodium sulfate were added. The solid was collected by filtration and the filtrate evaporated to dryness under reduced pressure. Crystallization from aqueous ethanol yielded 11a-aza-C-homo-5α,22a-spirostan-3β-ol.

*Example II*

4 g. of the latter compound was heated with 20 ml. of acetic anhydride in a sealed tube at 200° C. for 55 minutes; it was then cooled, the excess of anhydride was hydrolyzed by addition of 8 ml. of water and the mixture was treated with 2 g. of chromium trioxide in 25 ml. of 80% acetic acid; after stirring for three hours at room temperature, the mixture was diluted with water, extracted with ether and the extract was washed with water, dried over anhydrous sodium sulfate and the ether was evaporated. The residue was mixed with 200 ml. of 60% acetone containing 2 g. of potassium hydroxide and refluxed for 5 hours, then concentrated to a small volume, cooled, diluted with water and extracted with ether. The extract was washed several times with water, dried over anhydrous sodium sulfate and evaporated to dryness. Upon conventional acetylation, followed by recrystallization from acetone hexane, there was produced 3β-acetoxy-11a-N-acetyl-C-homo-Δ$^{16}$-allopregnen-20-one.

*Example III*

2 g. of 11a-aza-C-homo-5α,22a-spirostan-3β-ol (described in Example I) was treated with 2 ml. of acetic anhydride in 10 ml. of pyridine at room temperature. The mixture was allowed to stand overnight and was then diluted with water, the solid was collected by filtration, washed with water, dried and recrystalized from acetone-hexane thus affording 3β-acetoxy-11a-N-acetyl-C-homo-5α,22a-spirostan. The latter compound was then treated with acetic anhydride at 200°, the resulting pseudo-sapogenin oxidized to the diosone and was then treated with potassium hydroxide and reesterified as described in Example II to thus yield 3β-acetoxy-11a-N-acetyl-C-homo-Δ$^{16}$-allopregnen-20-one, identical with the compound obtained in Example II.

*Example IV*

2 g. of 3β-acetoxy-11a-N-acetyl-C-homo-Δ$^{16}$-allopregnen-20-one in 12 ml. of benzene, 1.0 ml. of Triton B (benzyltrimethyl ammonium hydroxide, Midwest Laboratories Inc.) and 1.2 ml. of t-butylhydroperoxide (Lucidol Division, Wallace and Tiernan, Inc.) were reacted at room temperature overnight. The mixture was then diluted with water, saturated with sodium chloride and extracted repeatedly with ether. The combined extracts were dried over anhydrous sodium sulfate and evaporated to dryness. By crystallization from acetone-hexane, 3β-acetoxy-11a-N-acetyl-16α,17α-oxido-C-homo-allopregnan-20-one was obtained.

*Example V*

1.4 g. of the above compound in 16 ml. of glacial acetic acid were treated with 3 ml. of acetic acid saturated with dry hydrogen bromide, stirring at room temperature for 1.5 hours. The mixture was then diluted with ice water and the bromohydrin which precipitated was collected by filtration, washed with water and refluxed with 10 g. of Raney nickel in 500 ml. of methanol for 30 minutes. The nickel was removed by filtration, the filtrate was evaporated to dryness and the residue crystallized from acetone-hexane thus furnishing 3β-acetoxy-11a-acetyl-C-homo-allopregnan-17α-ol-20-one.

*Example VI*

To 10 ml. of methanol containing 0.4 g. of 11a-N-acetyl-C-homo-allopregnan-3β,17α-diol-20-one 3-acetate was added 0.4 g. of sodium borohydride, 0.5 ml. of water and 2 ml. of dioxane, the resulting mixture was then refluxed for 5 hours, acidified with acetic acid and evaporated to a volume of 5 ml. Elution with water provided a crystalline product which was washed with water, dried and recrystallized from acetone to provide 11a-N-acetyl-C-homo - allopregnan - 3β,17α, 20 - triol; M.P. 238–240°; $[\alpha]_D$ —38° (pyridine).

*Example VII*

Treatment of the above product (210 g.) in 4 ml. of acetic acid with 400 mg. of lead tetraacetate for 20 minutes at room temperature provided a crystalline product after dilution with water. Recrystallization from methanol gave 11a-N-acetyl - C - homo-androstan-3β-ol-17-one, M.P. 279–280°; $[\alpha]_D$+172.6°. The same product could be obtained from its precursor by treatment with 2 equivalents of sodium periodate in liquid methanolic tetrahydrofuran.

Example VIII 1 g. of the above 17-ketone in 200 ml. of tetrahydrofuran was added to 200 ml. of 4 N ethereal methyl magnesium bromide. The mixture was then heated (calcium chloride for protection) for 48 hours at reflux temperature and finally decomposed with aqueous ammonium chloride. After extraction with ethyl acetate and water-washing of the extracts followed by solvent evaporation there was provided a residue which was crystallized from ether-acetone to provide 17α-methyl-11a-aza-C-homo-androstane-3β,17β-diol.

Example IX

By the same general method described in Example VIII, but employing ethynyl magnesium bromide or vinyl magnesium bromide there were also prepared 17α-ethynyl and 17α-vinyl-11a-aza-C-homo-androstane 3β,17β-diol.

Example X 1 g. of chromium trioxide was added slowly with agitation and cooling to 20 parts of dried pyridine. A solution of 1 g. of 17α-methyl-11a-aza-C-homo-androstane-3β,17β-diol was added dropwise and the resulting mixture was allowed to stand at room temperature overnight; ethylacetate was then added to the reaction mixture and the product filtered through celite and eventually through a short alumina column. The resulting eluates were then evaporated to dryness and the residue was recrystallized from acetone-hexane to provide 17α-methyl-11a-aza-C-homo-androstan-17β-ol-3-one.

Example XI

By the method of Example X there were also prepared 17α-ethynyl and 17α-vinyl-11a-aza-C-homo-androstan-17β-ol-3-one.

Example XII 1 g. of 17α-methyl-11a-aza-C-homo-androstan-17β-ol-3-one in 50 ml. of acetic acid and 10 ml. of acetic anhydride was treated with 1 g. of p-toluenesulfonic acid and the mixture was left at room temperature for 30 hours. Following this period the mixture was poured into water and the excess of anhydride was hydrolyzed. The solution was poured into water and the excess of anhydride was hydrolyzed. The solution was then made alkaline with solid sodium hydroxide whereafter isolation of the product by ethyl acetate extraction and recrystallization of the residue from acetone-ether gave 17α-methyl-11a-N-acetyl-C-homo-androstan-17α-ol-3-one 17-acetate. The same general method also provided the N-acetyl 17β-acetate derivative of the 3-ketone prepared in Example XI.

Example XIII

By the general method of Example VIII, by using exactly 2 equivalents of methyl magnesium bromide there was obtained 17α - methyl-11a-N-acetyl-C-homo-androstane-3β,17β-diol. By similar procedure but employing the corresponding vinyl magnesium bromide and ethynyl magnesium bromide there were obtained the corresponding 11a-N-acetyl-C-homo-androstane-3β,17β-diol substituted in the 17α-position by ethynyl or vinyl.

Example XIV

A solution of one part of sodium borohydride in 3 parts of water was added to one part of the 17-ketone obtained in Example VII dissolved in 120 parts of methanol. The mixture was allowed to stand at room temperature for 16 hours whereupon the excess reagent was decomposed with acetic acid. The solution was concentrated to a small volume, diluted with water and the resulting precipitate collected. Recrystallization from ethyl acetate-hexane provided 11a - N-acetyl-C-homo-androstane-3β,17β-diol.

Example XV 1 g. of 11a-N-acetyl-C-homo-pregnane-3β,17α-diol-20-one-3β-acetate dissolved in 50 cc. of tetrahydrofuran was added over 30 minutes to a stirred suspension of 7.2 g. of lithium aluminum hydride in 50 cc. of anhydrous tetrahydrofuran. The mixture was refluxed for 2 hours, cooled and the excess reagent was decomposed by cautious addition of a saturated solution of sodium sulfate in water. The product was isolated by addition of ethyl acetate, separation of the organic layer, drying over sodium sulfate and evaporation to dryness. Recrystallization from acetone yielded 11a-N-ethyl-C-homo-pregnane-3β,17α,20-triol.

Example XVI 750 mg. of the above product was treated with lead tetraacetate following the procedure described in Example VII yielding 11a-N-ethyl-C-homo-androstan-3β-ol-17-one.

Example XVII 1 g. of the foregoing steroid was reacted with methyl magnesium bromide, such as described in Example VIII, thus furnishing 17α-methyl-11a-N-ethyl-C-homo-androstane-3β,17β-diol.

Example XVIII

Upon reaction of 11a-N-ethyl-C-homo-androstan-3β-ol-17-one with ethynyl magnesium bromide or vinyl magnesium bromide following the method described in Example VIII, there were obtained 17α-ethynyl-11a-N-ethyl-C-homo-androstane-3β,17β-diol and 17α-vinyl-11a-N-ethyl-C-homo-androstane-3β,17β-diol.

Example XIX

A solution of 1 g. of 17α-methyl-11a-N-ethyl-C-homo-androstane-3β,17β-diol in 20 cc. of pyridine was treated following exactly the procedure described in Example X and 17α-methyl-11a-N-ethyl-C-homo-androstane-17β-ol-3-one was obtained.

By the same method were oxidized: 17α-ethynyl-11a-N-ethyl-C-homo-androstane-3α,17α-diol and 17α-vinyl-11a-N-ethyl - C - homo-androstane-3β,17β-diol to their corresponding 3-ketones: 17α - ethynyl-11a-N-ethyl-C-homo-androstan - 17β - ol-3-one and 17α-vinyl-11a-N-ethyl-C-homo-androstan-17β-ol-3-one.

Example XX 750 mg. of 17α-methyl-11a-N-ethyl-C-homo-androstan-17α-ol-3-one were acetylated in accordance with Example XII and 17α-methyl-11a-N-ethyl-C-homo-androstan-17β-ol-3-one 17β-acetate was obtained.

According to the same procedure were acetylated the two last compounds of Example XIX furnishing corresponding 17α - ethynyl - 11a-N-ethyl-C-homo-androstan-17β - ol-3-one-17β-acetate, and 17α-vinyl-11a-N-ethyl-C-homo-androstan-17β-ol-3-one-17β-acetate.

Example XXI 500 mg. of 11a-N-ethyl-C-homo-androstan-3β-ol-17-one obtained according to Example XVI was reduced with sodium borohydride following the procedure described in Example XIV yielding 11a-N-ethyl-C-homo-androstan-3β,17β-diol.

Example XXII 1 g. of 17α-methyl-N-acetyl-C-homo-androstane-3β,17β-diol in 30 cc. of pyridine was treated with 2 cc. of acetic anhydride. The reaction mixture was kept overnight at room temperature. Ethyl acetate was added and the solution washed successively with diluted hydrochloric acid, a 5% sodium bicarbonate aqueous solution and water. The extract was dried over anhydrous sodium sulfate and evaporated to dryness. The solid residue was recrystallized from acetone-hexane furnishing the 3β-acetate of 17α-methyl-11α-n-acetyl-C-homo-androstan-3β,17β-diol.

Following the same procedure, there were obtained from the starting compounds set forth below, the corresponding acetates indicated:

| Starting compound | Products |
|---|---|
| 17α-methyl-11a-N-ethyl-C-homo-androstane-3β,17β-diol. | 3β-acetate of 17α-methyl-11a-N-ethyl-C-homo-androstan-3β,17β-diol. |
| 17α-ethynyl-11a-N-ethyl-C-homo-androstane-3β,17β-diol. | 3β-acetate of 17α-ethynyl-11a-N-ethyl-C-homo-androstane-3β,17β-diol. |
| 17α-vinyl-11a-N-ethyl-C-homo-androstane-3β,17β-diol. | 3β-acetate of 17α-vinyl-11a-N-ethyl-C-homo-androstane-3β,17β-diol. |
| 11a-N-acetyl-C-homo-androstan-3β-ol-17-one. | 3β-acetate of 11a-N-acetyl-C-homo-androstan-3β-ol-17-one. |
| 11a-N-ethyl-C-homo-androstan-3β-ol-17-one. | 3β-acetate of 11a-N-ethyl-C-homo-androstan-3β-ol-17-one. |
| 11a-N-acetyl-C-homo-androstan-3β,17β-diol. | 3β,17β-diacetate of 11a-N-acetyl-C-homo-androstane-3β,17β-diol. |

*Example XXIII*

Following the procedure described in Example XII were acetylated the starting materials indicated furnishing the corresponding products set forth below:

| Starting materials | Products |
|---|---|
| 17α-methyl-11a-N-acetyl-C-homo-androstane-3β,17β-diol. | 3β,17β-diacetate of 17α-methyl-11a N-acetyl-C-homo-androstane-3β,17β-diol. |
| 17α-methyl-11a-N-ethyl-C-homo-androstane-3β,17β-diol. | 3β,17β-diacetate of 17α-methyl-11a-N-ethyl-C-homo-androstane-3β,17β-diol. |
| 17α-ethynyl-11a-N-ethyl-C-homo-androstane-3β,17β-diol. | 3β,17β-diacetate of 17α-ethynyl-11-a N-ethyl-C-homo-androstane-3β,17β-diol. |
| 17α-vinyl-11a-N-ethyl-C-homo-androstane-3β,17β-diol. | 3β,17β-diacetate of 17α-vinyl-11a-N-ethyl-C-homo-androstane-3β,17β-diol. |

*Example XXIV*

1 g. of 11a-N-ethyl-C-homo - androstan-3β-ol-17-one (obtained according to Example XVI) in 30 cc. of nitromethane and 5 cc. of methyl iodide were kept at 100° C. in a sealed tube for 6 hours. After cooling the sealed tube was opened, the solvents evaporated and the resulting solid residue was recrystallized from methanol-ether, furnishing the methoiodide of 11a-N-ethyl-C-homo-androstan-3β-ol-17-one.

Following the same procedure were treated the starting compounds named hereafter, furnishing the corresponding methoiodides set forth below:

| Starting compounds | Products |
|---|---|
| 17α-methyl-11a-N-ethyl-C-homo-androstane-3β, 17β-diol. | Methoiodide of 17α-methyl-11a-N-ethyl-C-homo-androstane-3β, 17β-diol. |
| 17α-ethynyl-11a-N-ethyl-C-homo-androstane-3β, 17β-diol. | Methoiodide of 17α-ethynyl-11a-N-ethyl-C-homo-androstane-3β, 17β-diol. |
| 17α-vinyl-11a-N-ethyl-C-homo-androstane-3β, 17β-diol. | Methoiodide of 17α-vinyl-11a-N-ethyl-C-homo-androstane-3β, 17β-diol. |
| 17α-methyl-11a-N-ethyl-C-homo-androstan-17β-ol-3-one. | Methoiodide of 17α-Methyl-11a-N-ethyl-C-homo-androstan-17β-ol-3-one. |
| 17α-ethynyl-11a-N-ethyl-C-homo-androstan-17β-ol-3-one. | Methoiodide of 17α-ethynyl-11a-N-ethyl-C-homo-androstan-17β-ol-3-one. |
| 17α-vinyl-11a-N-ethyl-C-homo-androstan-17β-ol-3-one. | Methoiodide of 17α-vinyl-11a-N-ethyl-C-homo-androstan-17β-ol-3-one. |
| 17α-methyl-11a-N-ethyl-C-homo-androstan-17β-ol-3-one-17β-acetate. | Methoiodide of 17α-Methyl-11a-N-ethyl-C-homo-androstan-17β-ol-3-one-17β-acetate. |
| 11a-N-ethyl-C-homo-androstane-3β, 17β-diol. | Methoiodide of 11a-N-ethyl-C-homo-androstan-3β, 17β-diol. |
| 3β, 17β-diacetoxy-17α-Methyl-11a-N-ethyl-C-homo-androstane. | Methoiodide of 3β, 17β-diacetoxy-17α-methyl-11a-N-ethyl-C-homo-androstane. |
| 11a-N-ethyl-C-homo-androstan-17β-ol-3-one. | Methoiodide of 11a-N-ethyl-C-homo-androstan-17β-ol-3-one. |

I claim:
1. A compound of the following formula:

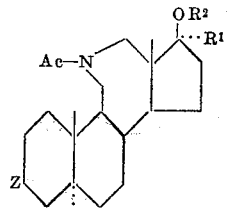

wherein $R^1$ is selected from the group consisting of hydrogen and aliphatic hydrocarbon containing up to eight carbon atoms; $R^2$ is selected from the group consisting of hydrogen and hydrocarbon carboxylic acyl of less than 12 carbon atoms; Z is selected from the group consisting of keto, β-hydroxy and β-hydrocarbon carboxylic acyloxy of less than 12 carbon atoms and Ac represents the acyl radical of a hydrocarbon carboxylic acid of less than 12 carbon atoms.

2. 11a-N-acetyl-C-homo-androstane-3β,17β-diol.
3. 17α-methyl-11a-N-acetyl - C - homo - androstan-17β-ol-3-one.
4. 17α-ethinyl-11a-N-acetyl - C - homo-androstan-17β-ol-3-one.
5. The hydrocarbon carboxylic acid ester of less than 12 carbon atoms of 17α-lower alkyl-11a-N-acetyl-C-homo-androstan-17β-ol-3-one.
6. The hydrocarbon carboxylic acid ester of less than 12 carbon atoms of 17α-lower alkyl-11a-N-acetyl-C-homo-androstan-3β,17β-diol.
7. A compound selected from the group consisting of the following formula:

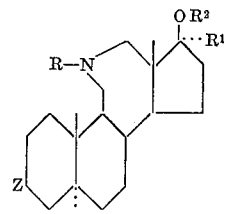

and the lower alkyl quaternary ammonium halides thereof wherein R is selected from the group consisting of hydrogen, alkyl and aralkyl containing up to 12 carbon atoms; $R^1$ is selected from the group consisting of hydrogen and aliphatic hydrocarbon containing up to eight carbon atoms; $R^2$ is selected from the group consisting of hydrogen and hydrocarbon carboxylic acyl of less than 12 carbon atoms; and Z is selected from the group consisting of keto, β-hydroxy and β-hydrocarbon carboxylic acyloxy of less than 12 carbon atoms.

8. 11a-aza-C-homo-androstan-3β,17β-diol.
9. 11a-aza-C-homo-androstan-17β-ol-3-one.
10. 17α-lower alkyl-11a-aza-C-homo-androstan-17β-ol-3-one.
11. The hydrocarbon carboxylic acid ester of less than 12 carbon atoms of 17α-lower alkyl-11a-aza-C-homo-androstan-17β-ol-3-one.
12. 17α-lower alkyl-11a-N-ethyl-C-homo-androstane-3β,17β-diol.
13. The hydrocarbon carboxylic acid ester of less than 12 carbon atoms of 17α-lower alkyl-11a-N-ethyl-C-homo-androstane-3β,17β-diol.
14. The methoiodide of 11a-N-ethyl-C-homo-androstane-3β,17β-diol.
15. The methoiodide of 17α-methyl-11a-N-ethyl-C-homo-androstan-17β-ol-3-one.

16. The hydrocarbon carboxylic acid ester of less than 12 carbon atoms of the methoiodide of 17α-methyl-11a-N-ethyl-C-homo-androstan-17β-ol-3-one.

17. A compound of the following formula:

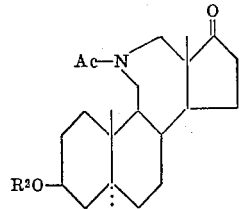

wherein R² is selected from the group consisting of hydrogen and hydrocarbon carboxylic acyl of less than 12 carbon atoms; and Ac represents the acyl radical of a hydrocarbon carboxylic acid of less than 12 carbon atoms.

18. 11a-N-acetyl-C-homo-androstan-3β-ol-17-one.

19. A compound selected from the group consisting of those of the following formula:

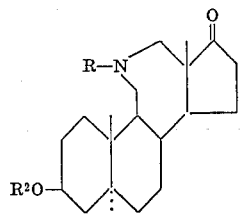

and the lower alkyl quaternary ammonium halide thereof wherein R is selected from the group consisting of hydrogen, alkyl and aralkyl containing up to 12 carbon atoms; and R² is selected from the group consisting of hydrogen and hydrocarbon carboxylic acyl of less than 12 carbon atoms.

20. 11a-N-ethyl-C-homo-androstan-3β-ol-17-one.

21. The methoiodide of 11a-N-ethyl-C-homo-androstan-3β-ol-17-one.

No references cited.